No. 747,250. PATENTED DEC. 15, 1903.
C. H. SMITH.
WHEEL OR PULLEY.
APPLICATION FILED FEB. 6, 1903. RENEWED NOV. 23, 1903.
NO MODEL.

Witnesses:
Ethel A. Teller
Otto A. Earl

Inventor,
Charles H. Smith
By Fred L. Chappell
Att'y.

No. 747,250. Patented December 15, 1903.

UNITED STATES PATENT OFFICE.

CHARLES H. SMITH, OF KALAMAZOO, MICHIGAN, ASSIGNOR TO MARY D. BIXBY, OF KALAMAZOO, MICHIGAN.

WHEEL OR PULLEY.

SPECIFICATION forming part of Letters Patent No. 747,250, dated December 15, 1903.

Application filed February 6, 1903. Renewed November 23, 1903. Serial No. 182,385. (No model.)

*To all whom it may concern:*

Be it known that I, CHARLES H. SMITH, a citizen of the United States, residing at the city of Kalamazoo, in the county of Kalamazoo and State of Michigan, have invented certain new and useful Improvements in Wheels or Pulleys, of which the following is a specification.

This invention relates to improvements in wheels or pulleys.

The objects of the invention are to provide an improved pulley or wheel by which the shock incident to the sudden application or variation of the power delivered thereto or to the load is reduced to a minimum.

Further objects will definitely appear from the detailed description to follow.

I accomplish the objects of my invention by the devices and means described in the following specification.

The invention is definitely pointed out in the claims.

A structure embodying the features of my invention is fully illustrated in the accompanying drawings, forming a part of this specification, in which—

Figure 1:
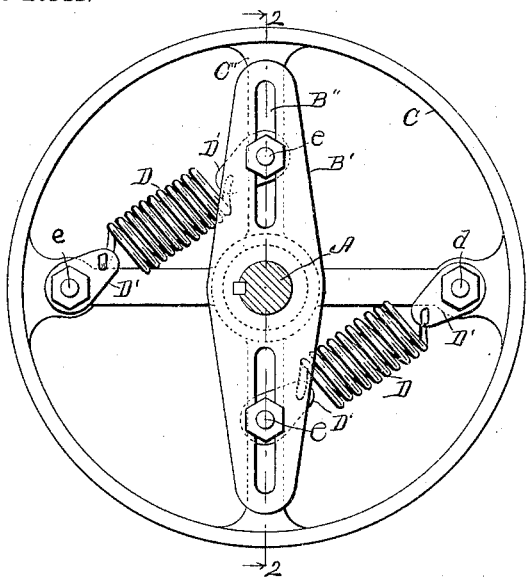
Figure 2:
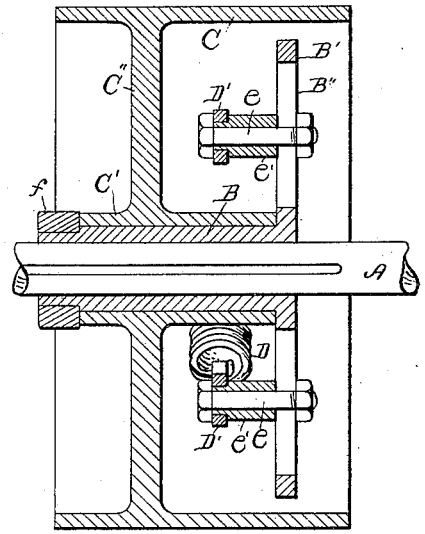
Figure 3:
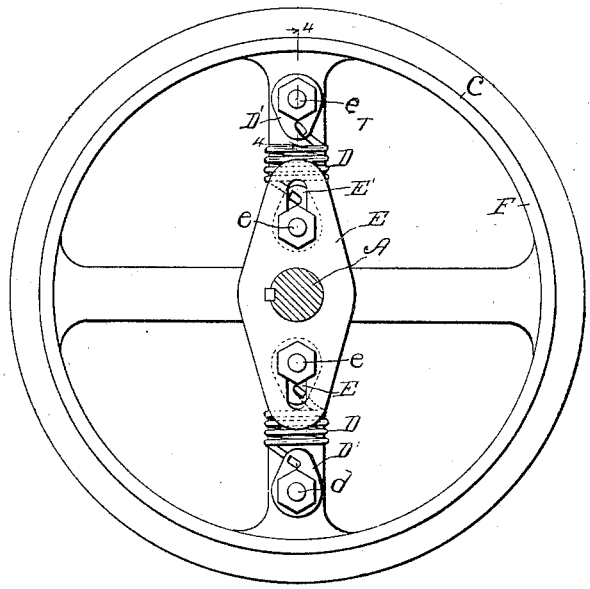
Figure 4:
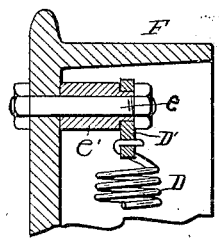

Figure 1 is a side elevation view of my improved pulley or wheel looking from the right of Fig. 2. Fig. 2 is a detail cross-sectional view taken on line 2 2 of Fig. 1. Fig. 3 is a side elevation view of my improved pulley or wheel slightly modified, the same being shown as applied to a car-wheel. Fig. 4 is a detail sectional view taken on a line corresponding to line 4 4 of Fig. 3.

In the drawings the sectional views are taken looking in the direction of the little arrows at the ends of the section-lines, and similar letters of reference refer to similar parts throughout the several views.

Referring to the lettered parts of the drawings, the hub-like sleeve B, having radial arms B' B', is secured to the shaft or axle A by a suitable key. The sleeve B forms a bearing for the wheel C, which is journaled thereon. The arms B' are slotted at B'' to receive the bolts e, which are adjustably clamped therein by suitable nuts. On the inwardly-projecting ends of the bolts are collars e', on which the rings D' are pivotally mounted. The rings D' are provided with eyes to receive the hooked ends of the coiled spring D. The opposite end of the coiled spring engages a similar ring D', carried by the bolt projecting inwardly from the spider C'' of the wheel, so that the pulley or wheel is yieldingly connected to the driving-shaft or to the axle by these springs D. The springs are preferably two in number, oppositely arranged, as this preserves the balance of the wheel and is found to be entirely sufficient. The pulley or wheel is thus yieldingly connected to the shaft or axle A, so that any sudden application or variation of power or resistance, either to the pulley or to the shaft, is received without producing a shock, as is the result with wheels of the ordinary construction.

While my improved wheel is particularly adapted for use as a pulley, it is also very desirable for use as car-wheels or the like, and I have illustrated it in Figs. 3 and 4 adapted for that purpose. When applied to the driven wheels of street-cars and the like, it obviates to a very large extent the objectionable jerking motion in starting and stopping the car.

It is evident that my improved wheel is applicable to a great variety of uses, and an enumeration thereof will not be attempted here.

I desire to remark that with my improved device in operation there is a great saving of power in the starting of machinery, as the power applied is stored in the spring and delivered more effectively.

I have illustrated and described my improved wheel in the form preferred by me on account of its simplicity and economy in manufacture. I am aware, however, that it is capable of very great variation in structural details without departing from my invention. The springs can be of any well-known form. The springs can be connected between the pulley or wheel and shaft in any way that will permit yielding movement between them.

Having thus described my invention, what I claim as new, and desire to secure by Letters Patent, is—

1. The combination of an axle; a sleeve B having radially-projecting arms B' carried thereby; a wheel mounted on said sleeve;

slots B'' in said arms B'; bolts e adjustably secured in said slots; bolts carried by said wheel; rings D' pivotally secured to said bolts; and coiled springs D secured to said rings D' all coacting for the purpose specified.

2. The combination of an axle; radially-projecting slotted arms carried thereby; bolts adjustably secured in said slots; a wheel; springs, and pivotal connections for said springs to said bolts and wheel, for the purpose specified.

3. The combination of an axle; radially-projecting slotted arms thereon; bolts adjustably secured in said slots; a wheel; springs secured to said bolts and to said wheel, for the purpose specified.

In witness whereof I have hereunto set my hand and seal in the presence of two witnesses.

CHARLES H. SMITH. [L. S.]

Witnesses:
ETHEL A. TELLER,
OTIS A. EARL.